US011477948B2

(12) United States Patent
Lipes

(10) Patent No.: US 11,477,948 B2
(45) Date of Patent: Oct. 25, 2022

(54) MANUALLY CONTROLLED AND OPERABLE SELF-PROPELLED SEED BED STERILIZATION SYSTEM AND METHOD TO PREVENT WEEDS

(71) Applicant: Arnold Lipes, Cote Saint-Luc (CA)

(72) Inventor: Arnold Lipes, Cote Saint-Luc (CA)

( * ) Notice: Subject to any disclaimer, the term of this patent is extended or adjusted under 35 U.S.C. 154(b) by 447 days.

(21) Appl. No.: 16/873,065

(22) Filed: Jan. 27, 2020

(65) Prior Publication Data

US 2021/0227757 A1   Jul. 29, 2021

(51) Int. Cl.
| | | |
|---|---|---|
| A01G 11/00 | (2006.01) | |
| A01M 7/00 | (2006.01) | |
| A01M 21/04 | (2006.01) | |
| B62B 5/00 | (2006.01) | |
| B62B 5/06 | (2006.01) | |
| F24H 1/06 | (2022.01) | |
| F24H 1/08 | (2022.01) | |
| F24H 9/00 | (2022.01) | |

(52) U.S. Cl.
CPC ........... *A01G 11/00* (2013.01); *A01M 7/0039* (2013.01); *A01M 21/04* (2013.01); *B62B 5/0046* (2013.01); *B62B 5/06* (2013.01); *F24H 1/06* (2013.01); *F24H 1/08* (2013.01); *F24H 9/0094* (2013.01)

(58) Field of Classification Search
None
See application file for complete search history.

(56) References Cited

U.S. PATENT DOCUMENTS

| 6,047,900 A  * | 4/2000 | Newson ............... A01M 21/04 47/1.5 |
| 2012/0288333 A1* | 11/2012 | Lipes ..................... A01G 11/00 405/128.7 |
| 2018/0160673 A1* | 6/2018 | Albert ................... F16K 31/004 |

FOREIGN PATENT DOCUMENTS

| DE | 202009001969 U1 * | 6/2009 | ............ A01M 21/04 |
| DE | 202013008922 U1 * | 4/2014 | ............ A01M 21/04 |
| DE | 202018100345 U1 * | 4/2018 | |

(Continued)

OTHER PUBLICATIONS

AgriEuro (Year: 2015).*

(Continued)

*Primary Examiner* — Steven S Anderson, II
*Assistant Examiner* — Kurt J Wolford
(74) *Attorney, Agent, or Firm* — Guy J. Houle; Houle Patent Agency Inc.

(57) ABSTRACT

A manually controlled and operable self-propelled seed bed sterilization system and method is provided for preventing weeds from growth in seed beds. The system includes a wheel driven shuttle vehicle having a hot water reservoir, a hot water applicator manifold housing, a dual-function pump and a controllable valve. A self-contained mobile hot water supply vehicle accompanies the shuttle vehicle and has a water heater with hose connections to the reservoir of the shuttle vehicle to provide a continuous water flow path. The burner of the water heater is controlled to heat the water in the range of about 205-207 degrees F. but below the boiling point of water not to create steam. The shuttle vehicle is displaced over the seed bed at a constant drive speed by an electric motor driven by a gas generator. An operator person guides the shuttle vehicle over the seed bed.

20 Claims, 9 Drawing Sheets

(56) References Cited

FOREIGN PATENT DOCUMENTS

ES 2308373 T3 * 12/2008 ............ A01M 21/04
JP 03259021 A * 11/1991 ............ A01G 11/00

OTHER PUBLICATIONS

AgriEuro Accessibility Date (Year: 2022).*
Eco Temp (Year: 2018).*
Eco Temp Accessibility Date (Year: 2022).*

* cited by examiner

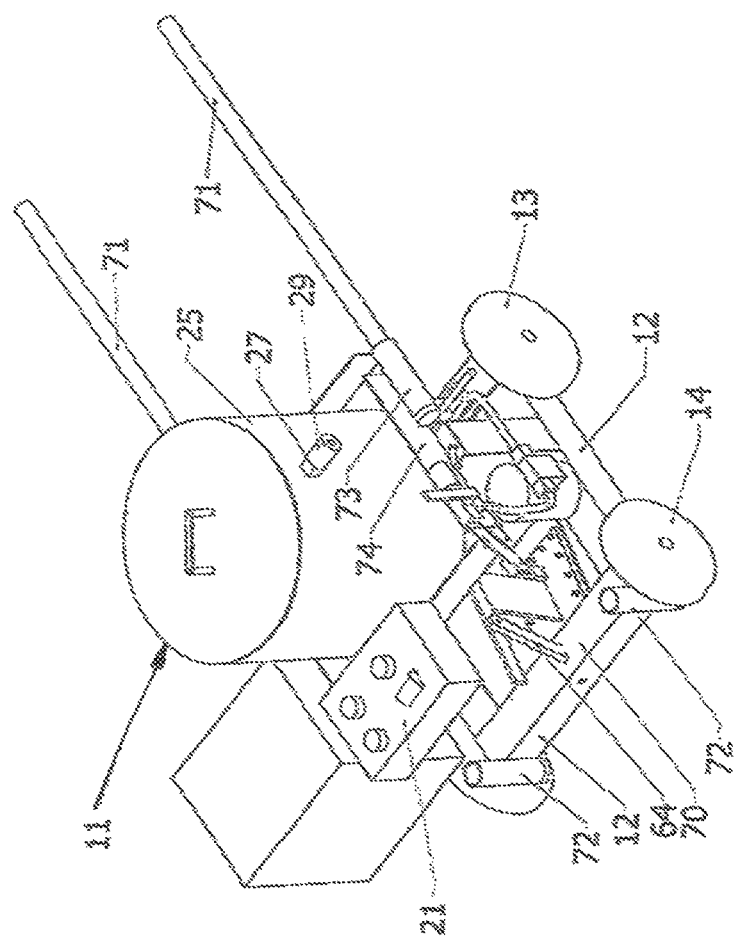
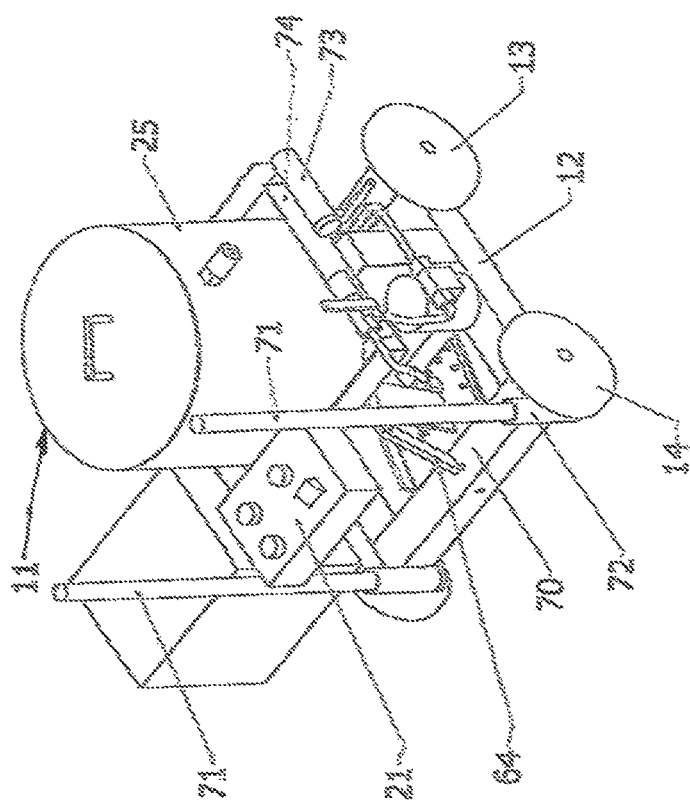
FIG 5B
FIG 5A

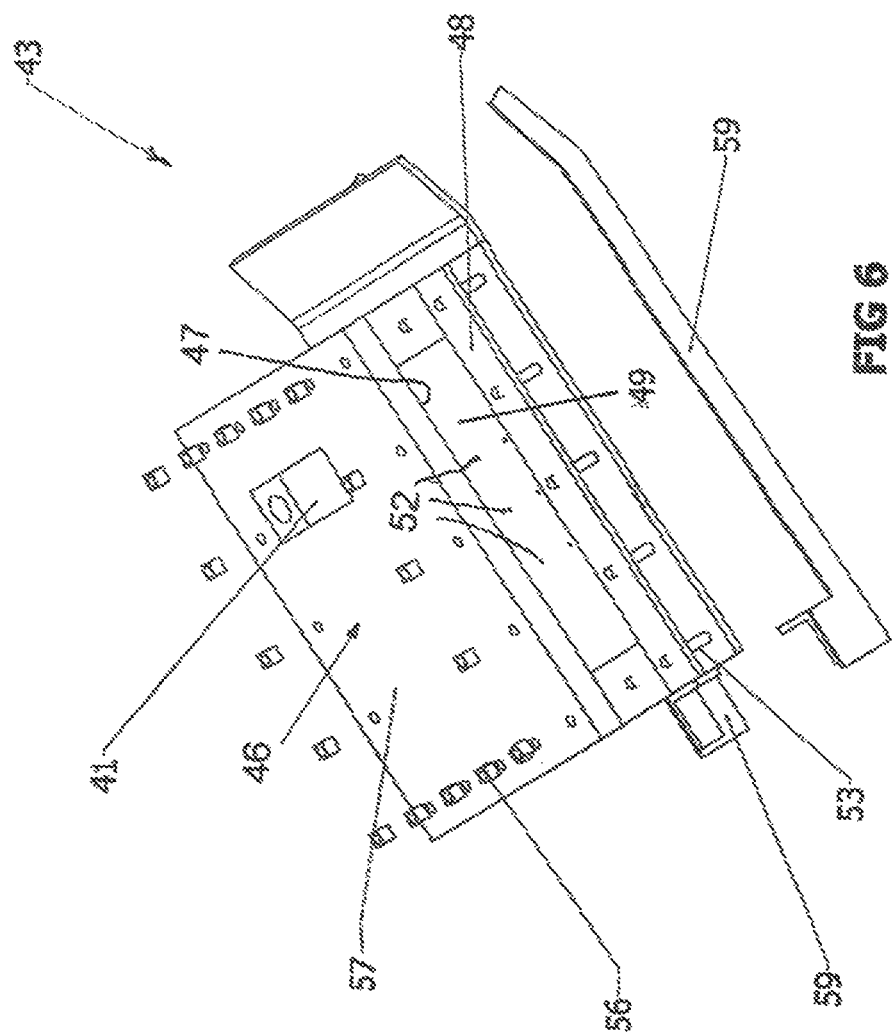

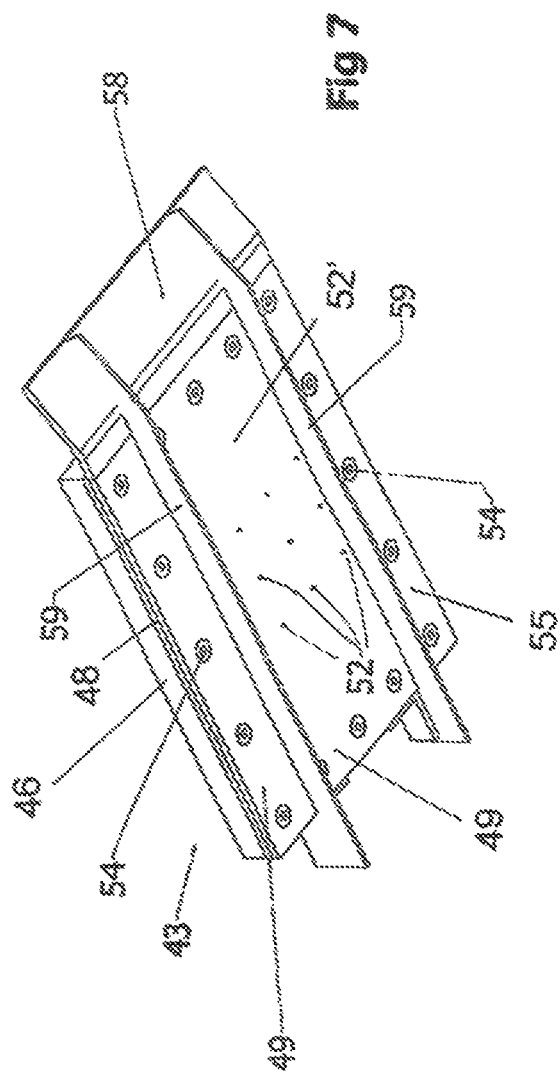

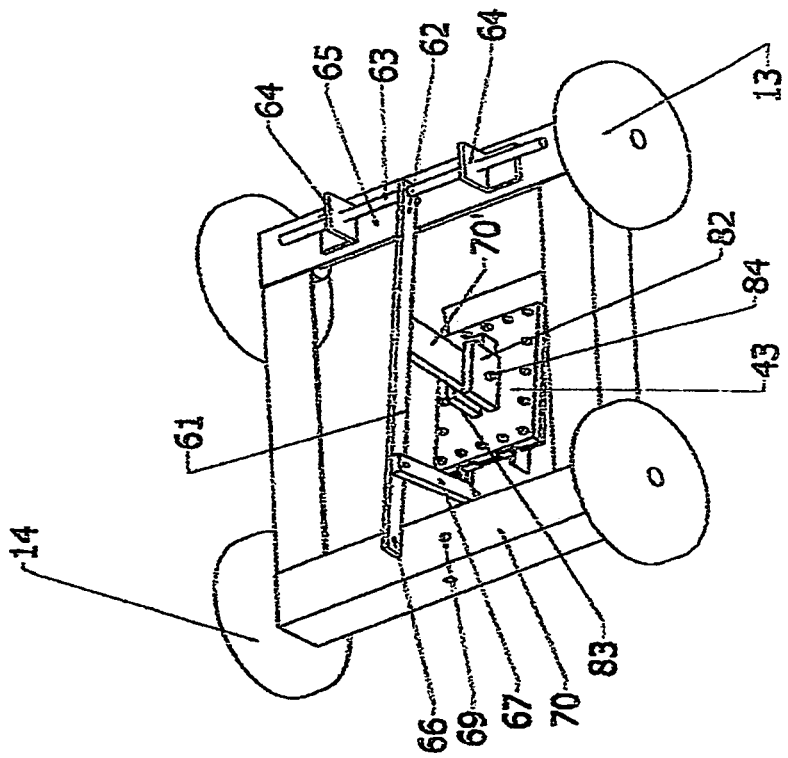
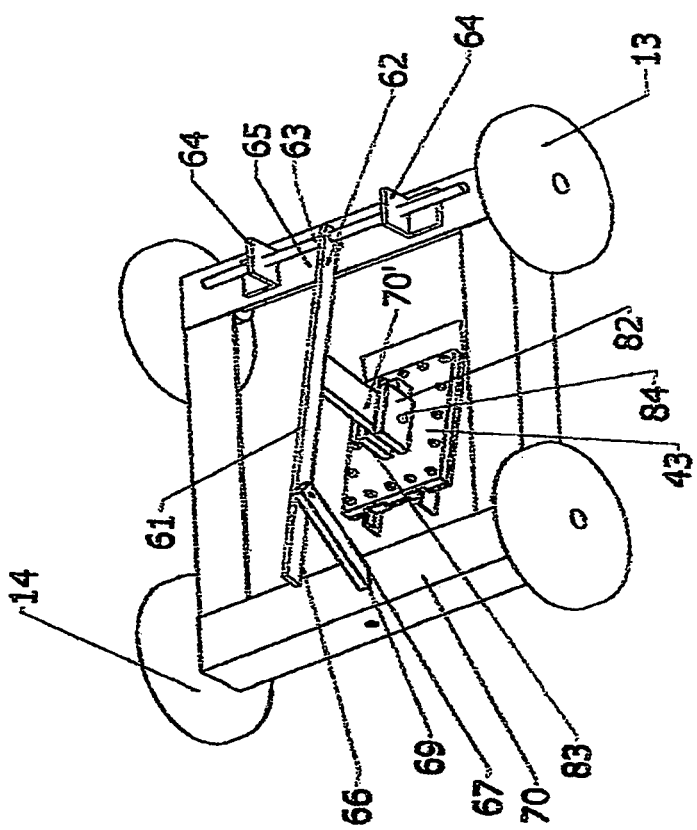

MANUALLY CONTROLLED AND OPERABLE SELF-PROPELLED SEED BED STERILIZATION SYSTEM AND METHOD TO PREVENT WEEDS

FIELD OF INVENTION

The present invention relates to a manually controlled and operable self-propelled vegetable seed bed sterilizing system and method for preventing undesirable weeds from growth in the seed bed.

BACKGROUND OF THE INVENTION

It is known to control weed growth by the use chemicals which are applied to the weeds by spray equipment and manually held spray containers or by the use of harsh chemicals in powder or granules from which are sprinkled on the weeds and such has been found to be hazardous to a person's health. When controlling weeds in agricultural crop cultivation it is preferable to use other means of weed control to reduce health risks to the grower. A common method is to use manual labor to pluck the weeds from the seed beds, but this is slow, and manpower is expensive. Steam and hot water used with a hot biodegradable foam agent and released on the weeds under pressure is also known to control undesirable vegetation. Such spraying systems are used with heavy farm type machinery which contains several spray nozzles and large water reservoirs which is usually pulled by a tractor. Such method kills the weeds, but the seeds of the weeds which are underground are usually not destroyed for the reason that the steam and hot water cools in the space between the spray nozzles and the weeds and by the time it precipitates by gravity into the soil below the ground surface, the water as cooled to a temperature which has no effect on the seeds.

A problem to many known weed control systems using hot water is their ability to maintain the water at a suitable high temperature whereby the seeds of the weeds exposed to the water will die. Because the containers are quite large, it is therefore imperative, to maintain hot water usually contained in the container, heated while the dispensing equipment is operative to insure that the water temperature does not fall to a temperature which has no effect on the unwanted vegetation. To this end, these containers, which are mounted on a trailer pulled by a tractor vehicle are equipped with resistive heating elements which are powered by electricity from the battery of the tractor or the containers are replenished with hot water at the farm house or barn where large amounts of water can be heated to elevated temperatures above 200 degrees F., or to the boiling point of water, and the water maintained at substantially that temperature by emersion electrical heating elements or by a gas burner. These techniques are costly and time consuming as the equipment has to be displaced to the source of water which may be far from the seed beds. Also, the heating equipment which is transported by the water supporting and dispensing apparatus is heavy and costly and therefore not suitable by small crop growers.

There exists a need to provide an effective weed control apparatus and method for the prevention of weeds in seed beds for small crop growers, such as residential farms, hobby farms, and gardens, and wherein such is compact and operable by a single person, and wherein the average row length is no more than 150 feet. A still further need is to have a water supply and a water heater in close proximity to the weed beds and the bed saturating equipment.

SUMMARY OF THE INVENTION

It is a feature of the present invention to provide a manually controlled and operable self-propelled seed bed hot water saturation system and method which provides at least the above-mentioned needs.

It is a further feature of the present invention to provide such system and method which is capable of killing the seeds of weeds embedded below the surface of the soil of seed beds by the use of hot water injected under pressure directly from the surface of the seed beds, such that the hot water remains enclosed with no possibility of harming the operator.

Another feature of the present invention is to provide a manually controlled and operable self-propelled seed bed saturation system and method which utilizes a wheel driven shuttle vehicle for sterilizing the seed beds in combination with a self-contained mobile water heating vehicle for heating water placed directly in a hot water holding tank of the shuttle vehicle and with the water in the hot water holding tank being heated by re-circulating the water between the hot water holding tank and a water heater mounted on a mobile water heating vehicle.

A further feature of the present invention is to provide a manually controlled and operable self-propelled seed bed saturation system which is easy to operate by one person and wherein the user person only needs to control the direction of the self-propelled shuttle vehicle.

Another feature of the present invention is to provide a manually controlled and operable self-propelled seed bed sterilization system wherein the hot water is injected into the soil with restraining bands on both sides to prevent the escaping of hot saturating water from said sides.

According to the above features, from a broad aspect the present invention provides a manually controlled and operable self-propelled seed bed sterilizing system for preventing the seeds of weeds from growth in the seed bed. A manually guidable wheel driven shuttle vehicle is provided, and it has a frame for supporting a hot water reservoir. A hot water applicator manifold housing is displaceably supported on the frame for displacement from a storage position to a seed bed contact position where hot water is discharged under pressure from a lower soil contact surface of the hot water applicator manifold housing and into the seed bed and at a substantially constant rate as the wheel driven vehicle is displaced there along by a constant speed drive. Directional control means is provided for the user person to manually control the direction of displacement of the wheel driven vehicle. A self-contained mobile hot water heater vehicle is also provided with the system and it has a water heater for heating water to be contained in the hot water reservoir. A dual-function water pump is mounted on the shuttle vehicle and connected between an outlet of the hot water reservoir and the controllable valve. The controllable valve has operable control means to direct water flow through a selected one of two outlet ports of the controllable valve. One of the outlet ports directs water to the inlet of the water heater. A conduit fitted with a quick-connect device delivers the water to said water heater. The other outlet of the controllable valve directs the water to the manifold housing that injects the hot water into the soil. A second conduit connects an outlet of the water heater to an inlet of the hot water reservoir, this said conduit having a quick-connect device at the discharge end.

According to another broad aspect of the present invention there is provided a method for sterilizing seeds of weeds present in a vegetable seed bed comprising the steps of:
(i) providing a wheel driven shuttle vehicle having a hot water reservoir, a hot water applicator manifold housing, a dual-function pump and a controllable valve,
(ii) providing a self-contained mobile hot water heater vehicle having a water heater with inlet and outlet connections to permit water flow through the water heater, a burner is provided for heating water in the water heater and wherein a burner control means is provided,
(iii) filling the hot water reservoir with water,
(iv) establishing a conduit connection between the outlet connection of the water heater and to an inlet of the hot water reservoir and the inlet of the water heater to a first outlet port of the controllable valve,
(v) operating the dual-function pump to circulate water in a continuous flow path through the water heater and the hot water reservoir,
(vi) monitoring the temperature of the water in the continuous flow path,
(vii) controlling the burner to control the heating temperature of the water in the flow path flowing through the water heater,
(viii) shutting off the dual-function pump and the burner once a desired temperature has been detected by step (vi),
(ix) operating the controllable valve to close the first outlet port and open a second outlet port thereof to provide for hot water flow from the hot water tank to the hot water applicator manifold,
(x) disconnecting the conduit connections of step (iv),
(xi) positioning the hot water applicator manifold onto the seed bed with the shuttle vehicle disposed there over, and
(xii) switching on the dual-function pump and a drive of the wheel driven shuttle vehicle to cause the shuttle vehicle to be displaced over and along the seed bed at a predetermined constant speed while a user person guides the shuttle vehicle along the seed bed with hot water from the hot water reservoir being injected under pressure from a lower surface of the hot water applicator manifold housing and into the seed bed to saturate any undesirable weed seeds.

BRIEF DESCRIPTION OF THE DRAWINGS

A preferred embodiment of the present invention will now be described with reference to the accompanying schematic concept drawings in which:

FIG. 5A is a perspective view of the shuttle vehicle showing the handle bars located at the rear of the vehicle for guiding the self-propelled vehicle along a seed bed being saturated with hot water;

FIG. 5B is a perspective view like FIG. 5A showing the handle bars located at the front of the vehicle for displacing and orienting the vehicle for displacement to a further location;

FIG. 6 is an exploded perspective view showing the construction of the hot water applicator manifold housing;

FIG. 7 is a bottom view of the hot water applicator manifold housing;

FIG. 8A is a top perspective view of the frame of the shuttle vehicle showing the hot water applicator manifold housing at a storage position elevated from a seed bed;

FIG. 8B is a view like FIG. 8A showing the disconnectable support linkage of the hot water applicator manifold housing disconnected from its storage position and in transit to its seed bed contact position.

DESCRIPTION OF THE PREFERRED EMBODIMENT

Figure 1:
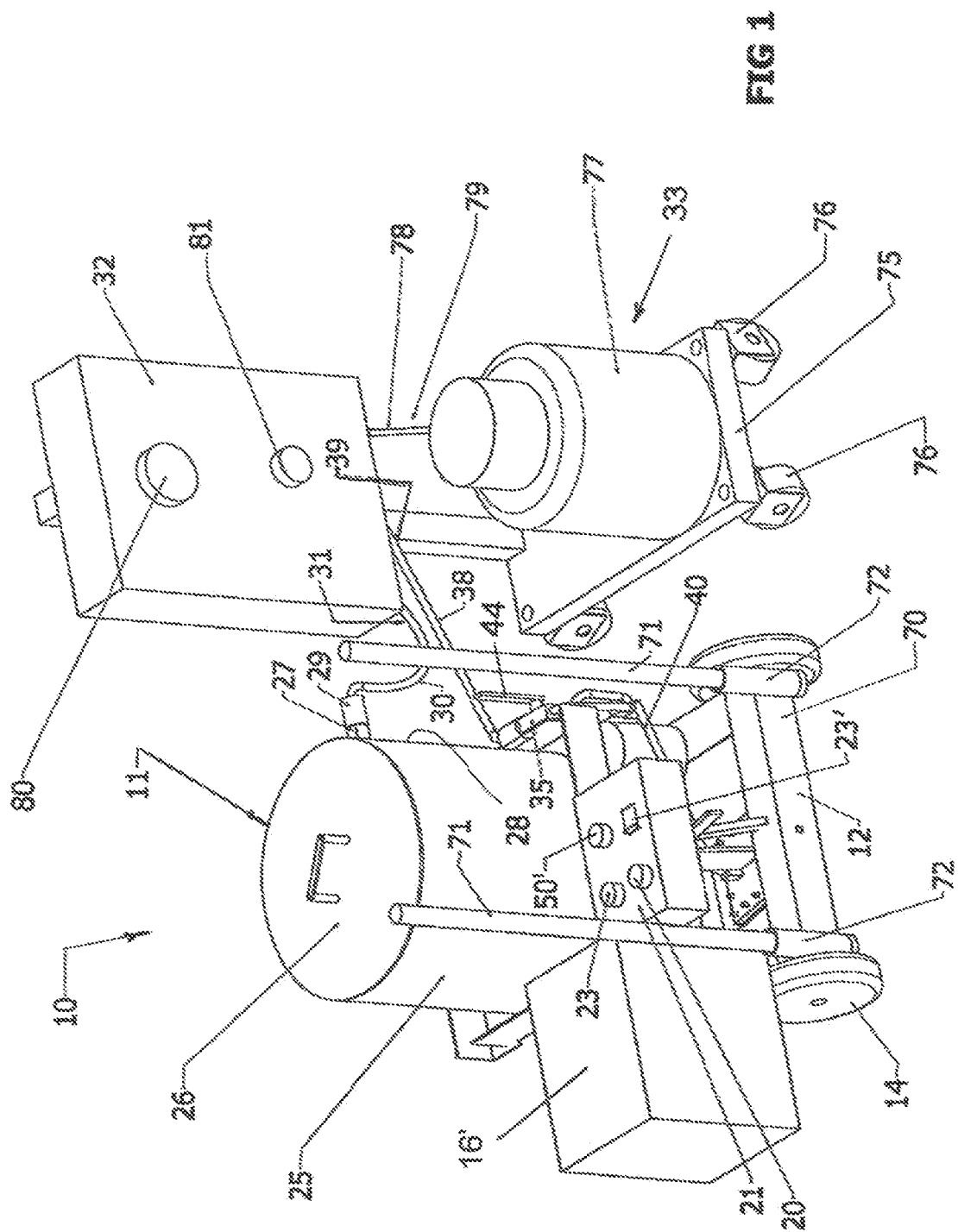
FIG. 1 is a schematic perspective rear view of the manually controlled and operable self-propelled seed bed sterilizing system of the present invention and wherein the shuttle vehicle is connected to a mobile water heating vehicle water heater by flexible conduits.

Referring to the drawings and more particularly to FIGS. 1 to 4 there is shown generally at 10 the manually controlled and operable self-propelled seed bed sterilizing system of the present invention for preventing weeds from growth in a seed bed. This is accomplished by the present invention by destroying the seeds of the weeds which are imbedded into the soil of the seed bed and to overcome the treatment methods of above ground spraying which have failed to prevent re-growth of the weeds by destroying only the weed portion exposed above the soil of the beds.

The system of the present invention was particularly developed for small vegetable growers and wherein the equipment is designed to be operated by only one person. The system is comprised of a manually guidable wheel driven shuttle vehicle 11 which is comprised of a frame 12 which is supported on a set of motor driven front wheels 13 and a set of free-running rear wheels 14. The front wheels are driven by an electric motor 15 which is provided power by a gas generator 16' mounted on the frame. As better seen from FIG. 4, the electric motor 15 is coupled to a gear box 16 in which is mounted a gear train, not shown but obvious to a person skilled in the art, and which gear train has a coupling gear ratio of 480/1 to rotate a drive sprocket gear 17 which is coupled to a driven sprocket gear 18 by a chain or link belt 22. The driven sprocket 18 is secured to the driven axle 19 of the front wheels. The motor is driven at a constant speed and is operated by a motor on/off switch 20 mounted on the rear console 21 of the shuttle vehicle 11. The constant motor drive provides for the shuttle vehicle to be displaced, in this embodiment, at a constant speed of 7 rpm. This speed is adjustable depending on the soil structure, and the adjustment of the speed is accomplished by a speed adjustment knob 23 provided on the console 21.

Figure 9:
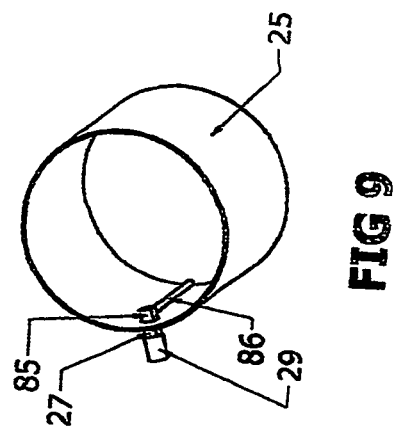
FIG. 9 is a fragmented perspective view of the reservoir.

A hot water containing reservoir 25 is also mounted on the frame 12 and in this embodiment has a dimension suitable to retain 15 gallons of water. The container is provided with a top cover 28, which is insulated, for access to the inside of the reservoir to fill the reservoir with water once it is empty. The cover also shields the hot water in the reservoir from ambient temperature and other outside elements such as rain. The reservoir also has an inlet hose coupling 27 secured to its sidewall 28 in a top portion of the reservoir for receiving a quick coupling 29 from a conduit, herein a flexible hose 30 which is secured to an outlet end 31 of a water heater 32 mounted on a self-contained mobile hot water heater vehicle 33. As shown in FIG. 9, the coupling 27 connects to a 90 degree elbow 85 coupling positioned inside the tank wall and to which is secured a dip pipe 86 to channel the hot water to an outlet spaced closely above the bottom wall of the reservoir 25. Accordingly, the heated water is released in the reservoir shielded from atmosphere above the water level in the reservoir to maintain pressure and avoiding the creation of steam. The reservoir 25 is also thermally insulated.

Figure 2:
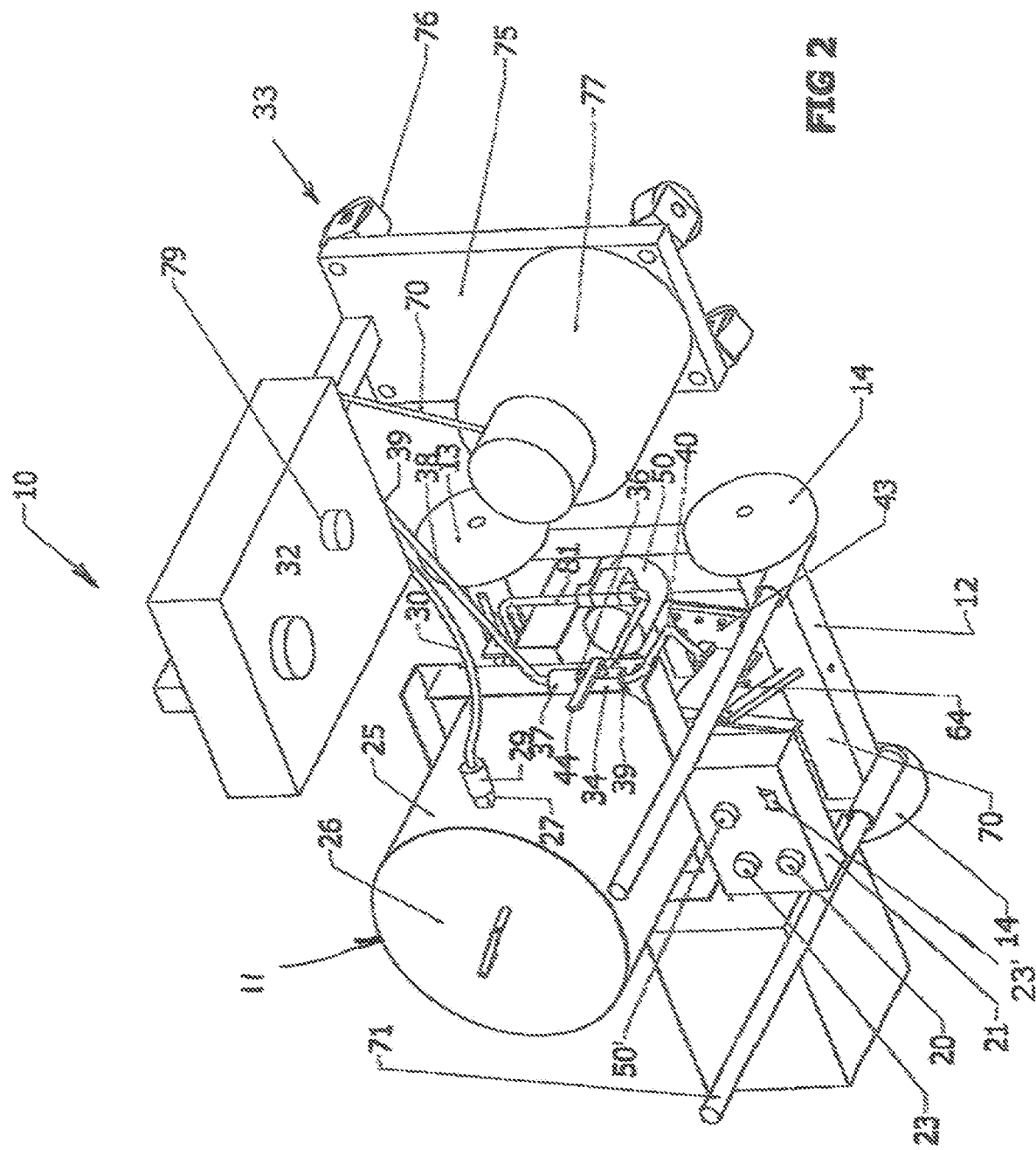
FIG. 2 is a top view of FIG. 1.
Figure 3:
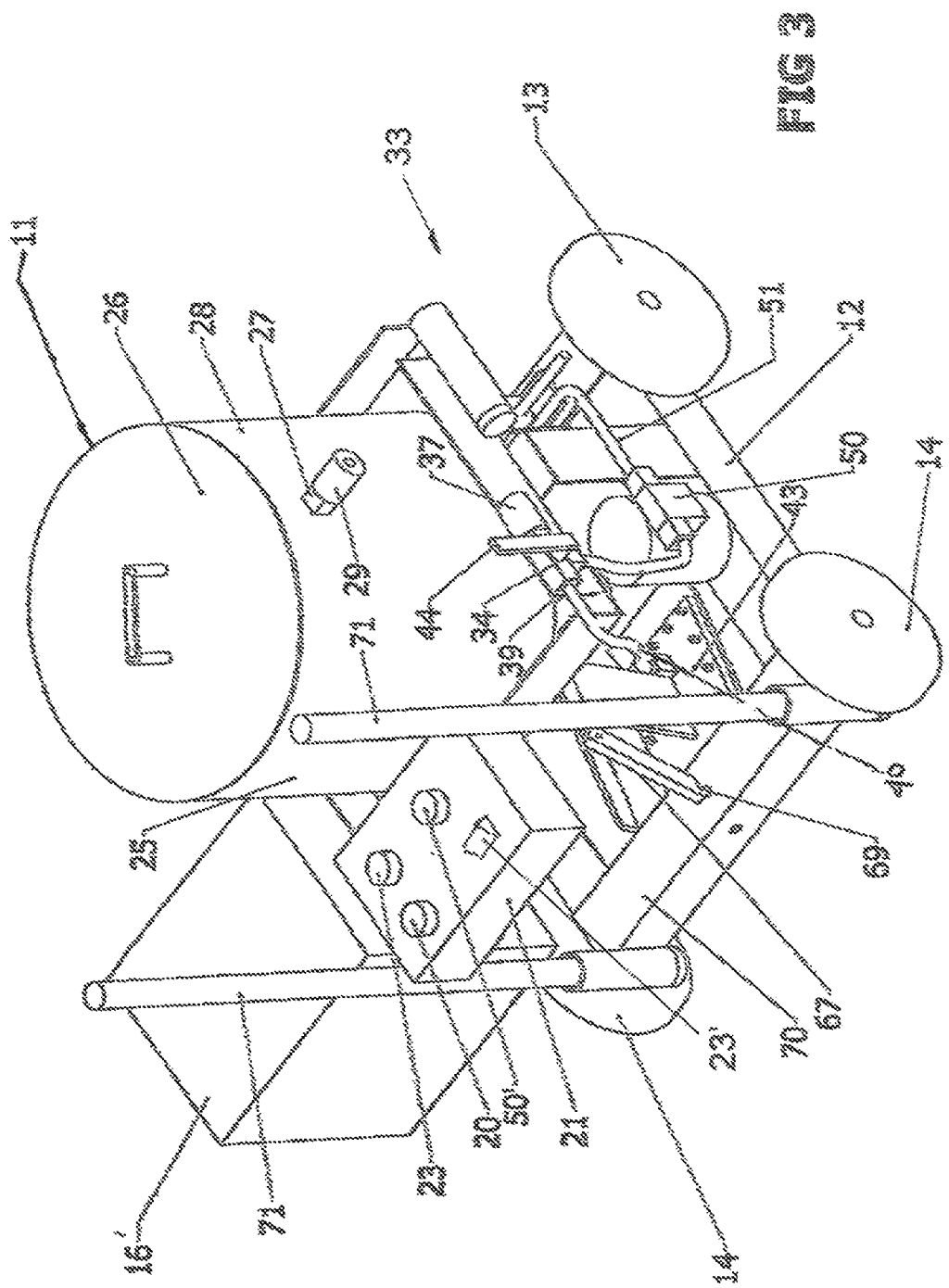
FIG. 3 is a top side view of the manually guidable wheel driven shuttle vehicle.
Figure 4:
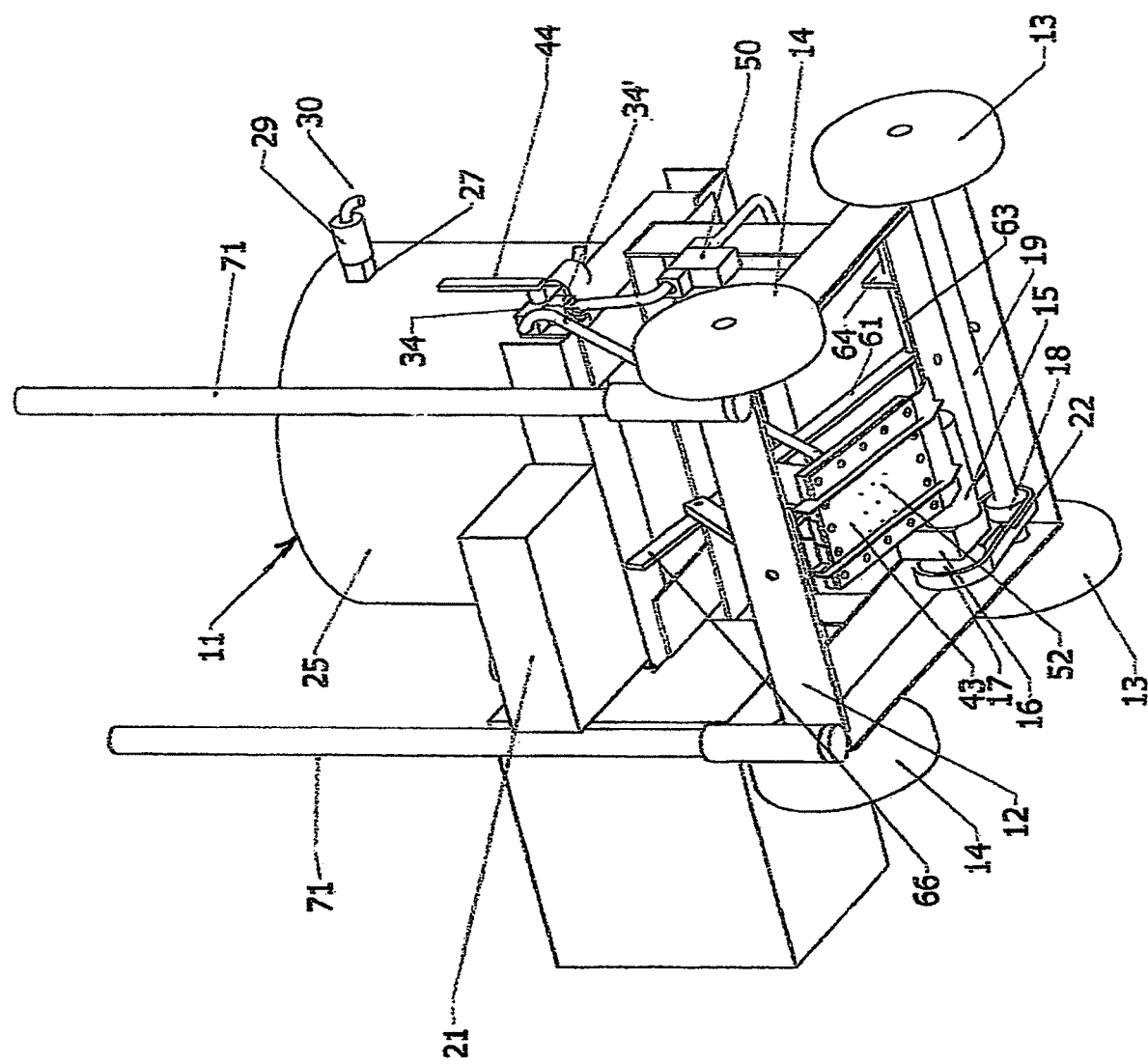
FIG. 4 is a bottom perspective view of the manually guidable wheel driven shuttle vehicle.

A 3-way controllable valve 34 has an inlet connection 34', secured to a pump 50 which receives water through hose 51 which is connected to an outlet connection, not shown, secured to a bottom portion of the reservoir 25 to provide water flow under pressure, regulated between 15 to 30 psi. The controllable valve 34 is further provided with a lever arm 44. When the lever 44 is in its upright position, as shown in FIG. 2, the water entering valve 34 at connection 34' is directed out of port 39 and water flow is established from the bottom end of reservoir 25 to the manifold housing 43 via hose 40. When the lever arm is displaced in a rearward direction, the water entering port 34' from the reservoir 25 is directed to port 36 of the valve 34. Port 36 is connectable by a quick-disconnect 37 of a flexible hose conduit 38 which is secured to an inlet end 39 of the water heater 32 mounted on the mobile hot water heater vehicle 33. This establishes a water flow from reservoir 25 to the water heater 32.

With reference now to FIGS. 6 and 7, there is shown the construction of the hot water applicator manifold housing 43. It is constructed of aluminum and stainless steel, and in the present embodiment has a dimension of 6 inches by 8 inches. It is to be noted that the present invention is not to be limited to these specific dimensions of this embodiment but can vary in size to so suit the size of the beds to be saturated. The applicator manifold housing is formed by a solid top rectangular plate 46 to which is secured the hose coupling 41 which leads to a water conduit, not shown, leading to a lower surface 47 of the plate 46. A rectangular contour gasket 48 is disposed between the top plate 46 and a thin stainless steel solid lower plate 49. The lower plate 49 is formed with a plurality of small jet holes 52 which constitutes jet holes through which hot water is released under pressure from the pump 50. A hot water manifold chamber is delineated between the top plate 46 and the bottom plate 49 by the thickness of the gasket 48 and provides a substantially even distribution of hot water to the jet holes 52. The top plate 46, the gasket 48 and the bottom plate 49 are secured in tight fit to one another by a plurality of bolts 53, the heads of such bolts being recessed in cavities 54 formed in the outer surface 55 of the bottom plate not to provide any obstructions in such outer surface as it is displaced on top of the seed beds. The bolts 53 are fastened by nuts 56 on the top surface 57 of the top plate 46.

As better seen in FIG. 7, the bottom plate 49 has an upwardly formed front edge portion 58 to cause any obstructions on the seed bed, such as stones and weeds, to be compressed under the manifold housing has it is displaced over the seed bed. The lower soil contact surface 52' of the bottom plate 49 of the hot water applicator manifold housing 43 is further provided with a pair of elongated straight barrier blades 59 disposed parallel to one another and extending in a respective vertical plane on a respective side of the plurality of the jet holes 52 to concentrate the hot water injected through the jet holes along a band 90 of the seed bed and to prevent soil erosion on opposed outer sides of the seed bed. The hot water pressure spray from the jet holes 52 into the soil sufficiently deep and at a temperature sufficient to destroy the seeds of weeds.

Figure 8C:
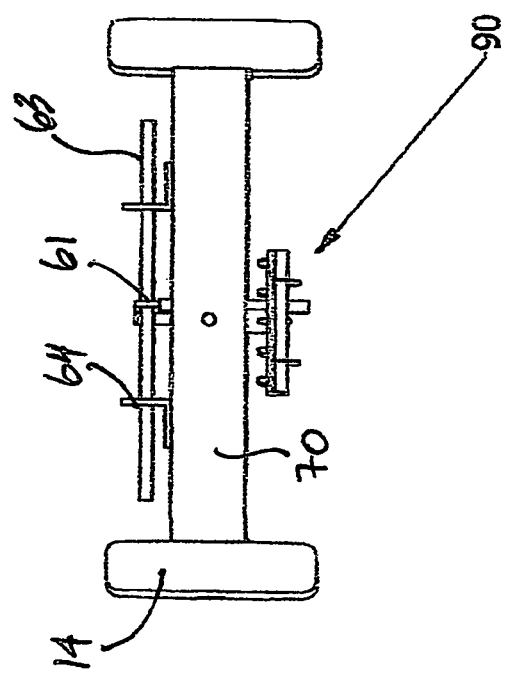
FIG. 8C is a rear simplified view showing the hot water applicator manifold housing with its bottom surface resting on top of a seed bed.

With reference now to FIGS. 8A to 8C, there is described the mounting and operation of the hot water applicator manifold housing 43. As herein illustrated, the manifold housing 43 is secured to a pivotal linkage which comprises a pivot support arm 61 pivotally secured at a front end 62 on a pivot rod 63 supported between a pair of brackets 64 secured to a front frame member 65. The rear end of the pivot support arm 61 constitutes a handle 68 for displacing the support arm 61. A connecting arm 70' is secured to the top surface 57 of the manifold housing and the pivot support arm 61. A pivotal support arm 67 is also pivotally secured to the pivot support arm 61 at a rear end thereof, in front of the handle portion 66, and is provided to hold the manifold housing to a storage position elevated from the soil. This is accomplished by lifting the handle 66 and placing the lower end 68 of the support arm 67 into a cavity 69 formed on the top surface of a rear frame member 70 or other engagement means.

To lower the manifold housing onto a seed bed it is only necessary for an operator person to lift the handle 66 and move the pivotal support arm forwardly out of contact with the cavity 69 and lower the manifold housing onto the top surface of the seed bed, as illustrated in FIG. 8C. As shown, support flanges 82 and 83 are secured spaced-apart on the top plate 43 of the manifold. A pivot rod 84 is secured between the flanges 82 and 83 and a lower end of the support bar 70' is pivotally connected thereto between the flanges. The lower end of the support bar 70' is spaced about ¼ inch above the top surface of the plate 43. Such pivotal support permits the manifold to pivot about 5 degrees in the forward and rearward directions as it is displaced over the seed bed.

FIGS. 5A and 5B illustrates directional control means to provide for a user person to manually control the direction of displacement of the wheel driven shuttle vehicle. It is simply provided by a pair of handle bars 71 which are removably attached to a pair of vertical tubes 72 secured to the rear frame member 70 on opposite sides thereof. A further pair of horizontal tubes 73 are secured to an elevated frame 74 on a front end of the shuttle vehicle to permit the handle bars 71 to be connected thereto to re-orient the shuttle vehicle. Because the shuttle vehicle 11 is driven at a constant speed by the drive motor 1, the operator person only has to guide the direction of movement of the shuttle vehicle and this is accomplished by holding the handle bars 71 and following the shuttle vehicle along the seed bed by holding the handle bars which extend vertically. When the shuttle vehicle reaches the end of a seed bed, the operator person shuts off the motor drive on/off switch 20 and the pump on/off switch 50' on the console 21. The operator person then removes the handle bars from its rear tubes 72 and positions the handle bars 71 in the front tubes, as shown in FIG. 5B. The operator person then lifts the handle bars to lift the front drive wheels off the ground to displace and re-orient the shuttle vehicle onto another bed or simply to move it to another location to fill it with water. Usually there is a close water supply to these seed beds and provided with a hose connection whereby it is not necessary to displace the shuttle vehicle. To prevent the handle bars from slipping out of the connecting tubes 72, 73 a detachable formation can be provided by suitable detachable connecting means.

With reference now not to FIGS. 1 and 2, there is described the self-contained mobile hot water supply vehicle 33 of the system. As above mentioned, it has a water heater 32 for heating water to be contained in the hot water reservoir 25 of the shuttle vehicle 11. The mobile water supply vehicle 32 has a support platform 75 to which is secured swivel wheels 76 for displacing the mobile water supply vehicle 33 to a location where the shuttle vehicle has stopped for re-filling the reservoir with a supply of water. A propane gas container 77 is supported on the platform 75 and has a gas line 78, equipped with a control valve 79 to supply gas under pressure to the water heater which is an instantaneous gas-fired water heater capable of raising the temperature of 1.6 gallons of water per minute by 45 degrees F. It is pointed out that the control valve is provided to modulate a burner flame of a burner associated with the water heater to control the rate of increase of temperature of the heated water in the recirculating flow path has the heated water approaches a predetermined temperature, herein in the range of between 200 to 207 degrees F. to slow down the increase in temperature not to exceed the boiling point of water to avoid creating steam. This temperature is monitored on the temperature gauge 80 mounted on the housing 81 of the water heater 32 and the user person controls the control valve 79 to modulate the flame to slow down the heating rate of the water flow to insure that its temperature is below the boiling temperature of water but sufficiently high to kill seeds of said undesirable weeds. By having the mobile water heater displaced besides the shuttle vehicle as soon as the water heater is disconnected, the shuttle vehicle immediately continues to saturate the bed in front of it not to delay the saturation process wherein the hot water can cool below the saturation temperature.

In this particular embodiment the reservoir 25 is filled with 15 gallons of water which is adequate to saturate approximately 200 feet of seed bed at a displacement shuttle speed of 7 rpm. A low water level indicator 23' is mounted on the console 21 and secured to a level detection device, not shown, but of a type well know in the art, and mounted on the reservoir 25 to provide an indication to the user person that the reservoir requires refilling.

Having thus described the construction of the shuttle vehicle 11 and the mobile hot water heater vehicle 33, the method of sterilizing weed seeds in a vegetable seed bed can be summarized as follows. Firstly, the hot water reservoir 25 of the shuttle vehicle is filled with a predetermined volume of water, herein 15 gallons sufficient to saturate 200 feet of seed bed. The mobile hot water supply vehicle 33 is positioned in close proximity to the shuttle vehicle. The conduit connections between the outlet connection 31 of the water heater 32 and the inlet connection 27 of the hot water reservoir and the inlet 39 of the water heater to the outlet port 36 of the controllable valve 37 are made. The dual-function pump 50 is operated to circulate water in a continuous flow path through the water heater and the hot water reservoir to start heating the water in the reservoir 25.

The user person monitors the temperature displayed on the temperature gauge 80 which is representative of the water temperature of the water flow though the water heater 32. The user person controls the burner flame intensity via the control valve 79 to control the rate of increase of the heating temperature of the water in the water flow path flowing through the water heater. Once the desired temperature, in the range of 205-207 degrees F., has been detected, the user person shuts off the dual-function pump 50 by switching off the switch 50' on the console 21. The user person then operates the controllable valve 37 to close the outlet port connected to the water heater and opens the second outlet port to provide for hot water flow from the hot water reservoir to the hot water applicator manifold housing 43. The conduits 30 and 38 are now disconnected.

Before heating the water in the reservoir 25, the shuttle vehicle 11 is positioned at an end of a seed bed to be sterilized. After the conduits are disconnected the hot water applicator manifold is displaced from its storage position and onto the top surface of the seed bed. The user person then operates the switches for the dual-function pump 50 and the drive motor of the driven wheels of the shuttle vehicle to cause the shuttle vehicle to be displaced over and along the seed bed at a predetermined constant speed while the user person guides the shuttle vehicle along the seed bed with hot water from the hot water reservoir being injected under pressure from the lower surface of the hot water applicator manifold housing and into the seed bed 90, as shown in FIG. 8C to sterilize any undesirable weed seeds.

The sterilizing shuttle vehicle of the present invention is designed to do one complete seed bed row at a time and the shuttle ideally starts at the beginning of a row and there is always enough water to complete the sterilizing of the seed bed. The water heater stays at the end of the farm and simply moves sideways to the next row. A low level water detector is provided to protect the pump to prevent it from running dry.

It is within the ambit of the present invention to cover any obvious modifications of the schematic illustration of the preferred embodiment construction of the system of the present invention as described herein, provided such modifications fall within the scope of the appended claims.

The invention claimed is:

1. A manually controlled and operable self-propelled seed bed sterilization system for preventing weeds from growth in said seed bed, comprising a manually guidable wheel driven shuttle vehicle having a frame for supporting a hot water reservoir, a hot water applicator manifold housing displaceably supported on said frame for displacement from a storage position to a seed bed contact position where hot water is discharged under pressure from a lower soil contact surface of said hot water applicator manifold housing and into said seed bed at a substantially constant rate as said wheel driven shuttle vehicle is displaced there along by a constant speed drive, directional manual controls for manually guiding the direction of displacement of said wheel driven shuttle vehicle by an operator person, and a self-contained mobile water heating vehicle having a water heater for heating water to be contained in said hot water reservoir, at least two conduits disconnectably securable between said water heater and said hot water reservoir and a controllable valve, a dual-function water pump mounted on said wheel driven shuttle vehicle and connected between an outlet of said hot water reservoir and said controllable valve, said controllable valve having a manually operable valve position control to direct water flow through said controllable valve to a selected one of two outlet ports of said controllable valve, one of said at least two conduits connecting an outlet of said water heater to an inlet of said hot water reservoir, another of said at least two conduits connecting an inlet of said water heater to one of said two outlet ports of said controllable valve, and a hot water supply conduit interconnecting the other of said two outlet ports of said controllable valve to said manifold housing, said dual-function pump controlling water flow through said controllable valve.

2. The seed bed sterilization system as claimed in claim 1 wherein said hot water applicator manifold housing is secured to a pivotal linkage having a pivot support arm displaceable to a first position for retaining said hot water applicator manifold housing elevated in said frame spaced above said seed bed, and a second position to cause said soil contact surface of said hot water applicator manifold housing to be positioned onto said seed bed and to permit limited pivoting of said soil contact surface on said soil bed, and a handle secured to a free end of said pivot support arm to permit for a user person to cause the displacement of said hot water applicator manifold housing.

3. The seed bed sterilization system as claimed in claim 1 wherein said lower soil contact surface of said hot water applicator manifold housing is provided with a pair of elongated straight barrier blades disposed parallel to one another and extending in a respective vertical plane on a respective side of a plurality of jet holes to concentrate said hot water injected through said jet holes along a band of said seed bed and to prevent the escape of hot water beyond the outer sides of said band.

4. The seed bed sterilization system as claimed in claim 1 wherein said water heater is one of a gas-fired water heater and a tankless water heater mounted on said self-contained mobile water heating vehicle, said water pump displacing a volume of water to be heated in a re-circulating flow path through said water heater and said hot water reservoir while maintaining a continuous hot water loop not exposed to atmosphere.

5. The seed bed sterilization system as claimed in claim 4 wherein there is further provided a water heater control for modulating a burner flame of a burner associated with said water heater to control the rate of increase of temperature of water in said re-circulating flow path as said heated water approaches a predetermined temperature being monitored on a water temperature gauge and which is below the boiling temperature of water but sufficiently high to kill seeds of said weeds.

6. The seed bed sterilization system as claimed in claim 5 wherein said predetermined temperature is in the range of 205 degrees F. to 207 degrees F., said water temperature gauge is secured to said inlet of said water heater, said water heater control being provided by a gas regulating valve of a gas supply tank mounted on said self-contained mobile water heating vehicle.

7. The seed bed sterilization system as claimed in claim 1 wherein said self-contained mobile water heating vehicle is mounted on wheels for displacing same to predetermined positions with respect to a plurality of seed beds to be saturated by said wheel driven shuttle vehicle wherein said hot water reservoir of said wheel driven shuttle vehicle can be filed with a predetermined volume of hot water to operate in a continuous process to continue saturating said plurality of seed beds after each time said hot water reservoir has dispensed of its contents, said hot water reservoir having water level detection device to detect the water reserve in said hot water reservoir and provide a display of said water level to said operator person.

8. The seed bed sterilization system as claimed in claim 1 wherein said manual controls is provided by a pair of handle bars removably securable to connectors provided at a rear end and a front end of said frame of said wheel driven shuttle vehicle, said pair of handle bars when secured at a rear end of said frame permitting said operator person to guide said wheel driven shuttle vehicle as it moves along said seed bed by motorized front driven wheels of said wheel driven shuttle vehicle, said pair of handle bars when secured at said front end of said frame permitting said frame to be lifted on rear idle wheels of said wheel driven shuttle vehicle and to be reoriented along a different path.

9. The seed bed sterilization system as claimed in claim 8 wherein said motorized front driven wheels are driven by an electric motor drive coupled thereto by a gear train to operate said front driven wheels at a predetermined constant speed, and a gas generator mounted on said wheel driven shuttle vehicle to provide power to said electric motor drive.

10. The seed bed sterilization system as claimed in claim 9 wherein said gear train has a gear ratio providing a predetermined constant lew speed to maintain a constant quantity of said hot water being injected into said seed bed at a predetermined rate as said wheel driven shuttle vehicle is displaced along said seed bed with said operator person guiding only the direction of movement of said wheel driven shuttle vehicle.

11. The seed bed sterilization system as claimed in claim 10 wherein said hot water reservoir has a 15-30 gallons capacity to provide for said wheel driven shuttle vehicle to saturate approximately 200 feet of seed bed, said pump being adjustable for generating between 15 to 30 psi pressure depending on the porosity of the soil of said seed bed to be saturated.

12. The seed bed sterilization system as claimed in claim 1 wherein there is further provided a control console mounted on said wheel driven shuttle vehicle having manually operable control motor to control a wheel drive of said wheel driven shuttle vehicle, and the operation of a dual-function pump and an electric generator.

13. The seed bed sterilization system as claimed in claim 1 wherein said at least two conduits is constituted by a pair of flexible hoses having quick connectors formed of a material sufficient to support said hot water temperature, said controllable valve being a 3-way valve and wherein said manually operable valve position control is a lever arm operable by said operator person to displace said flow path from said inlet end of said valve to a selected one of said two outlet ports.

14. A method for sterilizing seeds of weeds present in a seed bed comprising the steps of:
 (i) providing a wheel driven shuttle vehicle having a hot water reservoir, a hot water applicator manifold housing, a dual-function pump and a controllable valve,
 (ii) providing a self-contained mobile hot water heater vehicle having a water heater with inlet and outlet connections to permit water flow through said water heater, a burner for heating water in said water heater and a burner control valve to control the intensity of a burner flame of said burner to thereby control the temperature of said water flow through said water heater,
 (iii) filling said hot water reservoir with water,
 (iv) establishing a conduit connection between said outlet connection of said water heater and to an inlet of said hot water reservoir and said inlet of said water heater to a first outlet port of said controllable valve,
 (v) operating said dual-function pump to circulate water in a continuous flow path through said water heater and said hot water reservoir,
 (vi) monitoring the temperature of said water in said continuous flow path,
 (vii) controlling said burner to control the heating temperature of said water in said flow path flowing through said water heater,
 (viii) shutting said dual-function pump and said burner once a desired temperature has been detected by step (vi),
 (ix) operating said controllable valve to close said first outlet port and open a second outlet port thereof to provide for hot water flow from said hot water reservoir to said hot water applicator manifold,
 (x) disconnecting said conduit connections of step (iv),
 (xi) positioning said hot water applicator manifold housing onto said seed bed with said shuttle vehicle disposed there over, and
 (xii) switching on said dual-function pump and a drive of said wheel driven shuttle vehicle to cause said wheel driven shuttle vehicle to be displaced over and along said seed bed at a predetermined constant speed while a user person guides said wheel driven shuttle vehicle along said seed bed with hot water from said hot water reservoir being injected under pressure from a lower surface of said hot water applicator manifold housing and into said seed bed to sterilize any weed seeds.

15. The method as claimed in claim 14 wherein before step (iv) there is provided the steps of displacing said wheel driven shuttle vehicle at a location over the beginning of a seed bed to be saturated and displacing said self-contained mobile water heating vehicle in close proximity to said wheel driven shuttle vehicle.

16. The method as claimed in claim 14 wherein said step (vi) comprises monitoring a temperature indicating module to ensure that water temperature in said continuous flow path does not attain the boiling point of water, and wherein said step (vii) comprises operating a gas valve from a gas supply to said burner when the temperature of water in said continuous flow path approaches a desired temperature in the range of from 205-207 degrees F. by reducing the flame of said burner.

17. The method as claimed in claim 14 wherein said step (ix) comprises operating a lever arm of said controllable valve which is a 3-way valve to displace said flow path from an inlet end of said valve to a selected one of said two outlet ports.

18. The method as claimed in claim 14 wherein said step (xii) comprises providing a control console on said wheel driven shuttle vehicle and provided with switches to control the operation of said pump, an electric generator and a drive motor, said operator person operating said switches to control the operation of said pump, said generator and said drive motor.

19. The method as claimed in claim 18 wherein said drive motor is coupled to drive wheels of said wheel driven shuttle vehicle by a gear train coupling having a gear ratio in excess of 400:1 to maintain said predetermined constant speed of less than 10 rpm.

20. The method as claimed in claim 14 wherein said hot water reservoir has a 15-30 gallons capacity to provide for said wheel driven shuttle vehicle to saturate approximately 150 feet of seed bed, said pump being adjustable for generating between 15 to 30 psi pressure depending on the porosity of the soil of said seed bed to be saturated.

\* \* \* \* \*